US007065354B2

(12) United States Patent
Park et al.

(10) Patent No.: US 7,065,354 B2
(45) Date of Patent: Jun. 20, 2006

(54) BATTERY CHARGING APPARATUS CAPABLE OF CONNECTING A MOBILE PHONE WITH A WIRE TELEPHONE NETWORK AND METHOD FOR ENABLING THE SAME

(75) Inventors: Joung-Kyou Park, Seoul (KR); Dong-Jun Cho, Yongin-shi (KR)

(73) Assignee: Samsung Electronics Co., Ltd. (KR)

( * ) Notice: Subject to any disclaimer, the term of this patent is extended or adjusted under 35 U.S.C. 154(b) by 465 days.

(21) Appl. No.: 10/269,143

(22) Filed: Oct. 11, 2002

(65) Prior Publication Data

US 2004/0203481 A1   Oct. 14, 2004

(51) Int. Cl.
*H04Q 7/20* (2006.01)
(52) U.S. Cl. .................. 455/426.1; 455/41.2; 455/555; 455/573
(58) Field of Classification Search ............. 455/426.1, 455/426.2, 554.1, 554.2, 555, 556.1, 552.1, 455/553.1, 41.2, 41.3, 572, 573
See application file for complete search history.

(56) References Cited

U.S. PATENT DOCUMENTS

| 5,526,402 | A | * | 6/1996 | Dent et al. ................ 455/426.1 |
| 5,887,259 | A | | 3/1999 | Zicker et al. |
| 6,445,921 | B1 | * | 9/2002 | Bell ......................... 455/426.1 |

2002/0106994 A1   8/2002   Payne et al.

FOREIGN PATENT DOCUMENTS

CN         1471332        1/2004

OTHER PUBLICATIONS

Search Report of the European Patent Office dated Feb. 27, 2003, issued in a counterpart application, namely, Appln. No. 02022802.9.
"Specification of the Bluetooth System—Wireless connections made easy—Profiles—Version 1.1: Part K:3 Cordless telephony profile", Feb. 22, 2001, pp. 99-144.
"Blue Station-A100: Bluetooth LAN & PSTN Access Point" CLIPCOMM Bluetooth Mobile Access Products, Aug. 23, 2001.

* cited by examiner

*Primary Examiner*—Lee Nguyen
(74) *Attorney, Agent, or Firm*—Dilworth & Barrese LLP

(57) ABSTRACT

A battery charging apparatus enables a mobile phone to be used not only for its own use but also as a cordless telephone. The battery charging apparatus includes a telephone section and a Bluetooth section. The telephone section is connected between a public network and the Bluetooth section so as to interface an incoming call from the public network to the combined cordless/mobile phone through the Bluetooth section and to interface a call oriented from the combined cordless/mobile phone to the public network through the Bluetooth section. The Bluetooth section is connected between the telephone section and the combined cordless/mobile phone so as to transmit and receive wireless data.

12 Claims, 10 Drawing Sheets

BATTERY CHARGING APPARATUS CAPABLE OF CONNECTING A MOBILE PHONE WITH A WIRE TELEPHONE NETWORK AND METHOD FOR ENABLING THE SAME

BACKGROUND OF THE INVENTION

1. Field of the Invention

The present invention relates to a battery charging apparatus for a mobile phone, and more particularly to a battery charging apparatus having a Bluetooth module.

2. Description of the Related Art

In general, a mobile phone is used more frequently outdoors and is used only in receiving a phone call indoors where a wire telephone is provided. In other words, since a call charge for a mobile phone is more expensive than a call charge for a usual wire telephone, it may be rather burdensome for a user to use a mobile phone indoors in place of a wire telephone when making a phone call.

However, although the call charge for a mobile phone is more expensive than the call charge for a usual wire telephone, the mobile phone may store many phone numbers and enable a user to search the stored phone numbers and make a phone call to a stored phone number by simply touching one or more keys. Therefore, due to the conveniences as described above, some users often utilize the mobile phone indoors also, instead of the wire telephone which requires the users to manually dial the phone number one key by one key.

Meanwhile, recent mobile phones each contain a Bluetooth module, so that a local area wireless communication can be made between mobile phones. The Bluetooth is a standard for enabling a wireless connection between mobile apparatuses such as portable PCs and mobile phones in a narrow area at a low cost. The Bluetooth enables voice and data to be exchanged without physical cables between various digital communication apparatuses by utilizing a wireless frequency. For example, the Bluetooth wireless technology may be realized in a mobile phone and a lap top computer, enabling them to be connected with each other without a cable. Also, in fact, all digital appliances such as PDAs (personal digital assistants), desktop computers, facsimile machines, keyboards, and joysticks can be a part of the Bluetooth system.

That is, the Bluetooth enables various communication equipments such as mobile phones, notebook computers, facsimile machines, and MP3 players to be connected with each other through a wireless link. Detail transmission standards proposed by the Bluetooth enable data to be provided with security and protected from interference. Further, Bluetooth systems may be manufactured in a form of small-sized microchip, so that they can be incorporated in communication systems. Moreover, the Bluetooth systems are so designed as to operate in a frequency band of 2.4 GHz which is a worldwide compatible communication frequency band. The Bluetooth standard provides two electric power levels. Between them, the lower power level is an electric power level enough to enable wireless communication only within a room, and the higher power level is an electric power level enough to enable wireless communication within an entire house.

SUMMARY OF THE INVENTION

Accordingly, the present invention has been made to solve the above-mentioned problems occurring in the prior art, and an object of the present invention is to provide an apparatus which has a construction modified from a conventional desktop battery charging apparatus having been utilized only in charging a battery of a mobile phone in the prior art, so that the apparatus can be connected with a general wire telephone network and a mobile phone having a Bluetooth module, thereby enabling a mobile phone to be used not only for its own use but also as a cordless telephone.

It is another object of the present invention to provide a method which enables a mobile phone to be used not only for its own use but also as a cordless telephone.

In order to accomplish this object, there is provided a battery charging apparatus for charging a battery of a combined cordless/mobile phone, the battery charging apparatus comprising a telephone section and a Bluetooth section, wherein: the telephone section is connected between a public network and the Bluetooth section so as to interface an incoming call from the public network to the combined cordless/mobile phone through the Bluetooth section and to interface a call oriented from the combined cordless/mobile phone to the public network through the Bluetooth section; and the Bluetooth section is connected between the telephone section and the combined cordless/mobile phone so as to transmit and receive wireless data.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention rather unclear.

Figure 1:
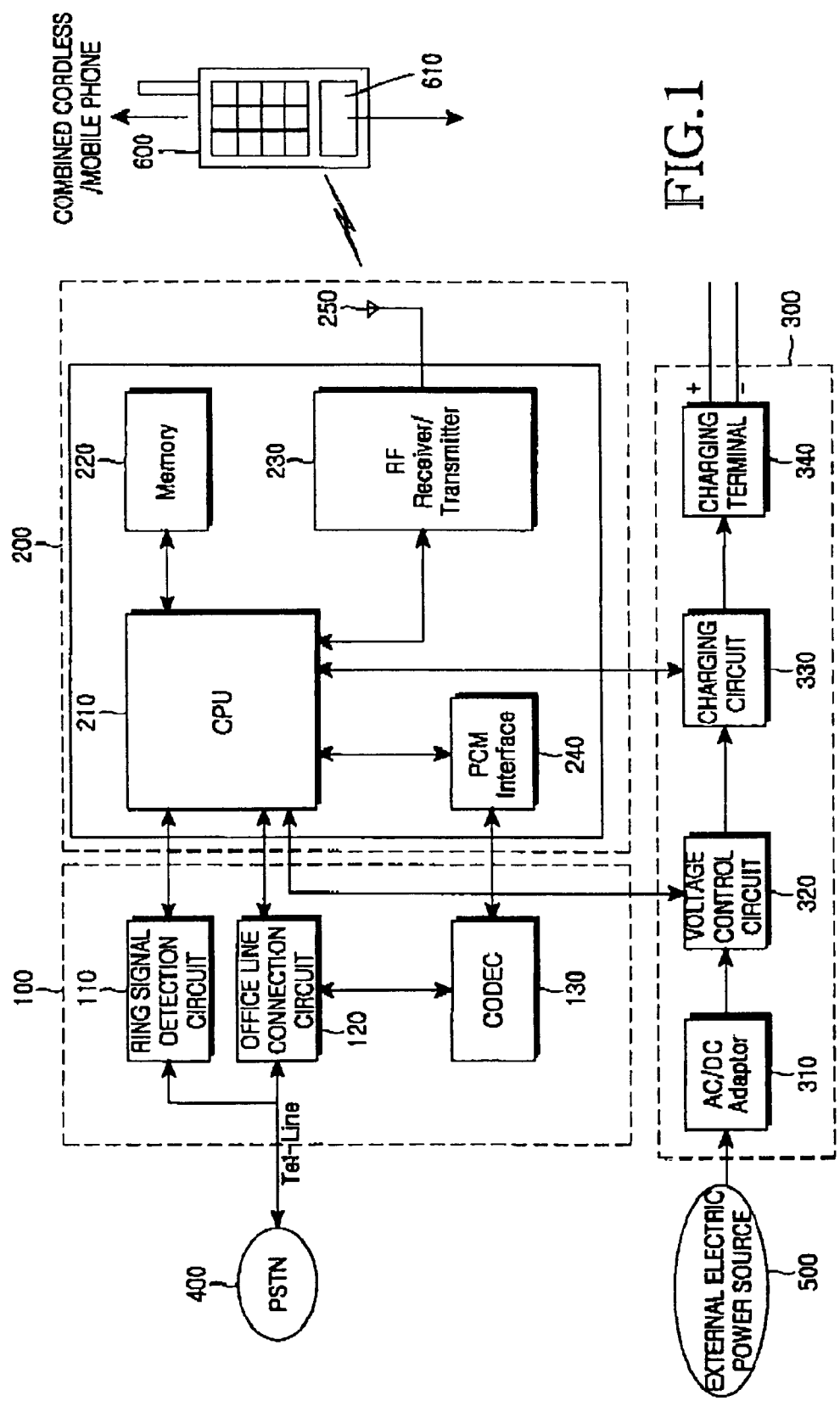
FIG. 1 is a block diagram of a battery charging apparatus according to the first embodiment of the present invention.

FIG. 1 is a block diagram of a battery charging apparatus according to the first embodiment of the present invention.

A battery charging apparatus according to the first embodiment of the present invention includes a telephone section 100, a Bluetooth section 200, and a charging section 300. The telephone section 100 includes a ring signal detection circuit 110 which is connected with a public network 400 and which detects a ring signal of a received call, an office line connection circuit 120 which interfaces a call command and an audio signal of a telephone, and a CODEC 130 which is connected between the Bluetooth section 200 and the office line connection circuit 120 so as to convert PCM data into analog voice and vice versa.

The telephone section 100 is connected between the public network 400 and the Bluetooth section 200 so as to interface an incoming call from the public network 400 to a combined cordless/mobile phone 600 through the Bluetooth section 200. Further, the telephone section 100 interfaces a call oriented from the combined cordless/mobile phone 600 to the public network 400 through the Bluetooth section 200. Specifically, the ring signal detection circuit 110 of the telephone section 100 is connected with a telephone line connected with the public network 400, so as to detect a ring signal received from the public network 400 and deliver the detected ring signal to the CPU 210 of the Bluetooth section 200. The office line connection circuit 120 of the telephone section 100 is connected between the telephone line connected with the public network 400 and the CPU 210 of the Bluetooth section 200, so as to interface the audio signal and call command received from or transmitted to the public network 400.

The Bluetooth section 200 of the battery charging apparatus includes a CPU 210, a memory 220, a PCM interface 240, and an RF receiver/transmitter 230 transmitting and receiving data through a Bluetooth antenna 250. The CPU 210 of the Bluetooth section 200 according to the present embodiment controls not only the Bluetooth section 200 but also the general operation of the telephone section 100 and the charging section 300. Specifically, in the present embodiment, the CPU 210 of the Bluetooth section 200 controls a charging circuit 330 and a voltage control circuit 320 of the charging section 300 and the ring signal detection circuit 110 and the office line connection circuit 120 of the telephone section 100. The memory 220 stores a program for controlling the CPU 210. The RF receiver/transmitter 230 is also connected with the CPU 210, so as to modulate/demodulate data. The Bluetooth section 200 further includes the Bluetooth antenna 250 connected with the RF receiver/transmitter 230 so as to transmit and receive data through RF wave.

Meanwhile, the charging section 300 includes an AC/DC adapter 310, a voltage control circuit 320, a charging circuit 330, and a charging terminal 340. The charging section 300 is connected with an external electric power source 500 so as to receive electric power from the external electric power source 500, and charges a battery when the battery is connected with the charging section 300. A detailed description about the construction and operation of the charging section 300 will be omitted here since they are similar to those of a common battery charging apparatus. According to the first embodiment of the present invention as described above, a mobile phone can be connected with a public network through a battery charging apparatus and can be used as a cordless telephone.

Figure 2:
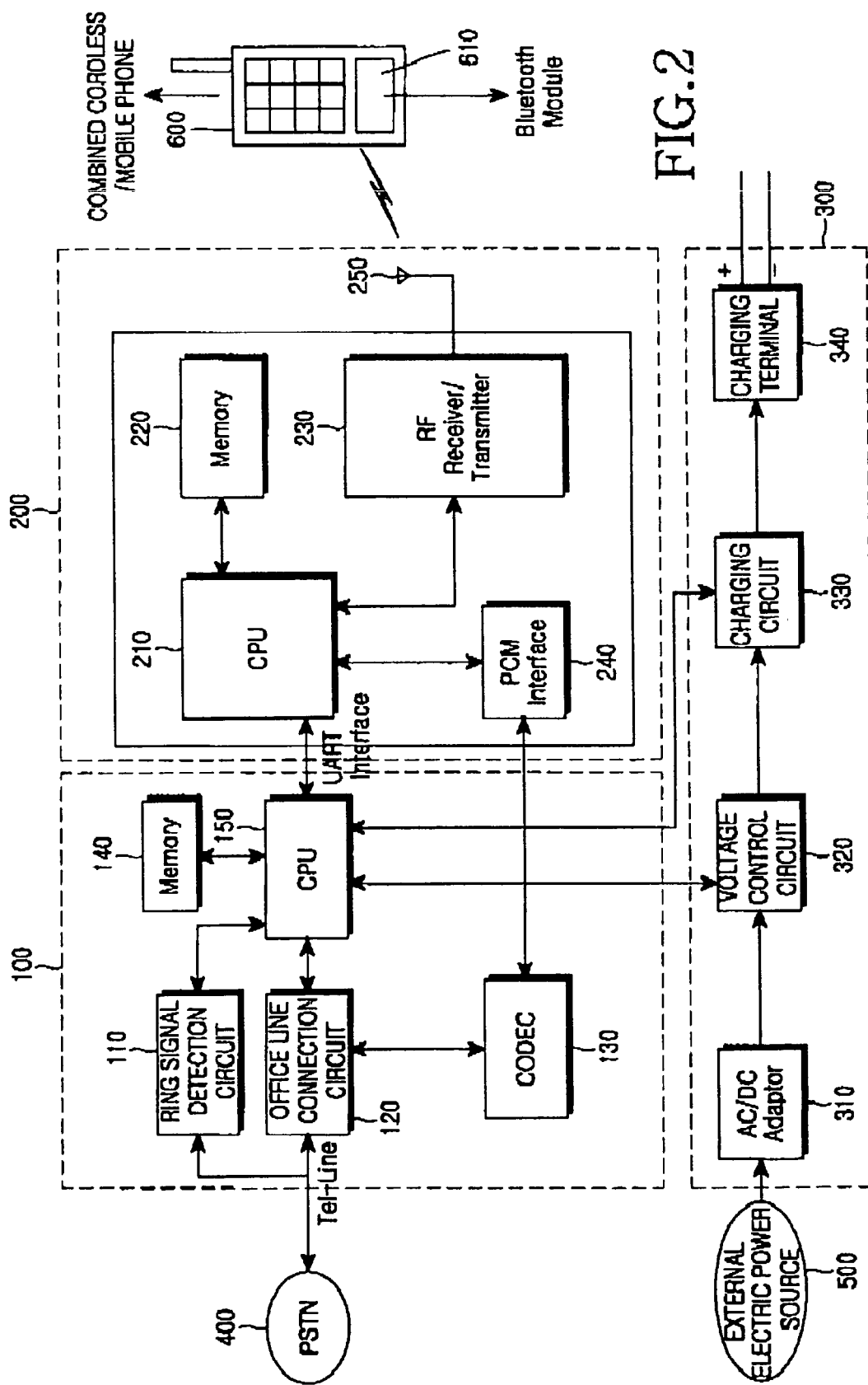
FIG. 2 is a block diagram of a battery charging apparatus according to the second embodiment of the present invention.

FIG. 2 is a block diagram of a battery charging apparatus according to the second embodiment of the present invention.

The battery charging apparatus according to the second embodiment of the present invention has the same construction as that in the first embodiment, excepting that the battery charging apparatus according to the present embodiment includes two CPUs. That is, in the battery charging apparatus according to the second embodiment, one CPU is included in the telephone section 100 while the other CPU is included in the Bluetooth section 200.

In more detailed description, all of the telephone section 100, although the Bluetooth section 200, and the charging section 300 are controlled by the CPU 210 of the Bluetooth section 200 in the first embodiment of the present invention, the Bluetooth section 200 is controlled by the CPU 210 of the Bluetooth section 200 while the telephone section 100 and the charging section 300 are controlled by a CPU 150 of the telephone section 100 in the second embodiment of the present invention. That is, the CPU 150 of the telephone section 100 controls the ring signal detection circuit 110 and the office line connection circuit 120 of the telephone section 100 and the voltage control circuit 320 and the charging circuit 330 of the charging section 300, while the CPU 210 of the Bluetooth section 200 controls the memory 220, the RF receiver/transmitter 230, and the PCM interface 240. These two CPUs transmit and receive data through a Universal Asynchronous Receiver-Transmitter (UART) interface.

The above-described battery charging apparatus according to the second embodiment of the present invention can be realized without significantly changing the constructions of a usual telephone and Bluetooth module and enables a mobile phone to be connected with a public network through a battery charging apparatus and thus be used as a cordless telephone.

Figure 3:
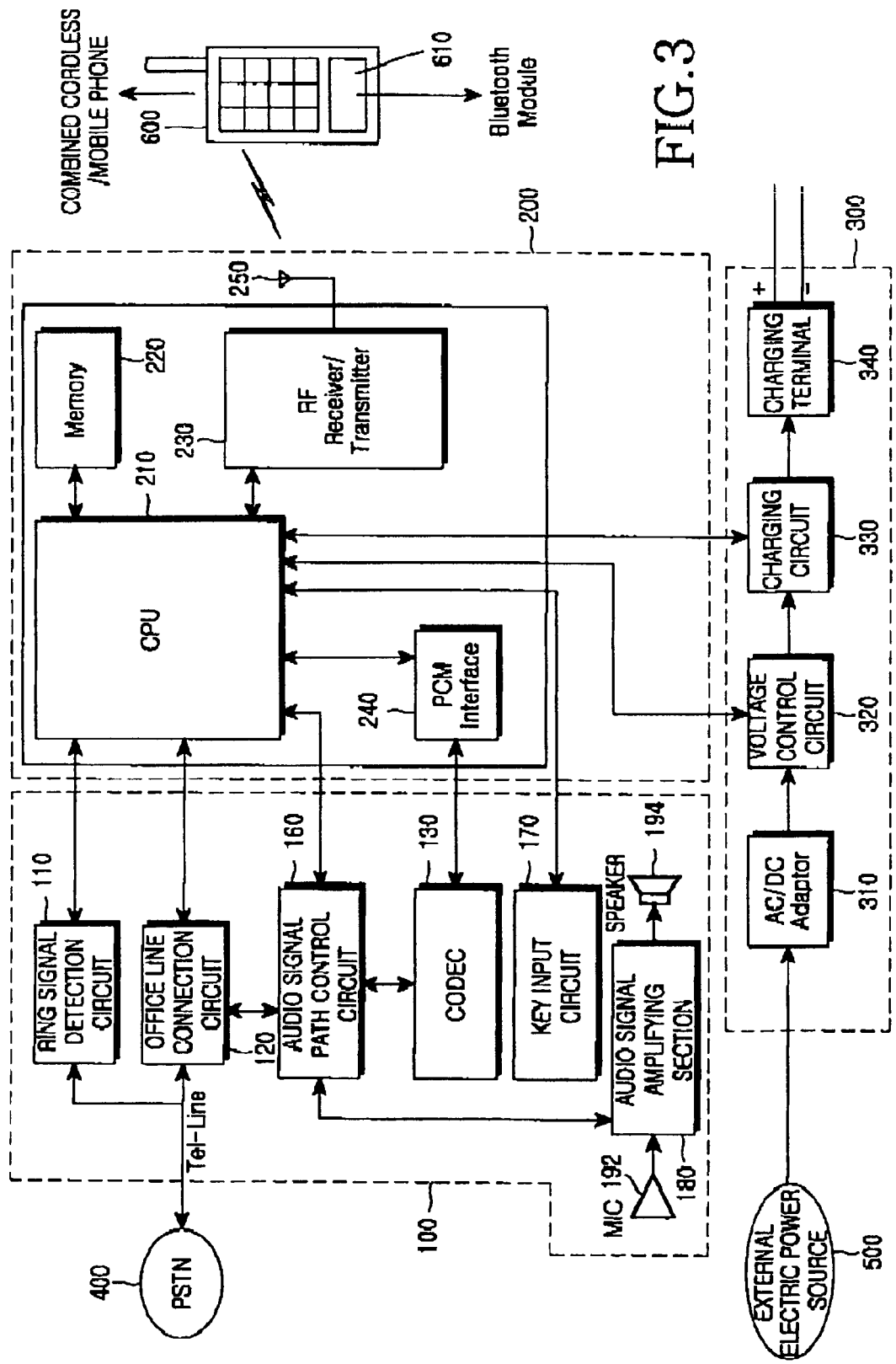
FIG. 3 is a block diagram of a battery charging apparatus according to the third embodiment of the present invention.

FIG. 3 is a block diagram of a battery charging apparatus according to the third embodiment of the present invention.

The battery charging apparatus according to the third embodiment of the present invention has the same construction as that in the first embodiment, except for the telephone section 100. The telephone section 100 of the battery charging apparatus according to the third embodiment of the present invention includes an audio signal path control circuit 160, a key input circuit 170, an audio signal amplifying section 180, a microphone 192, and a speaker 194, in addition to the construction of the telephone section 100 according to the first embodiment of the present invention. The microphone 192 and the speaker 194 together serve as a usual receiver of a telephone. The audio signal amplifying section 180 amplifies signals inputted and outputted through the microphone 192 and the speaker 194. The audio signal path control circuit 160 switches or synthesizes the signals inputted and outputted through the microphone 192 and the speaker 194 and signals inputted through the CODEC 130 from the Bluetooth section 200. Further, the key input circuit 170 enables the battery charging apparatus to dial for itself. As a result, the battery charging apparatus can function as a typical wire telephone. Therefore, the battery charging apparatus according to the third embodiment of the present invention not only can function as a usual wire telephone but also enables a mobile phone to be used as a cordless telephone.

Figure 4:
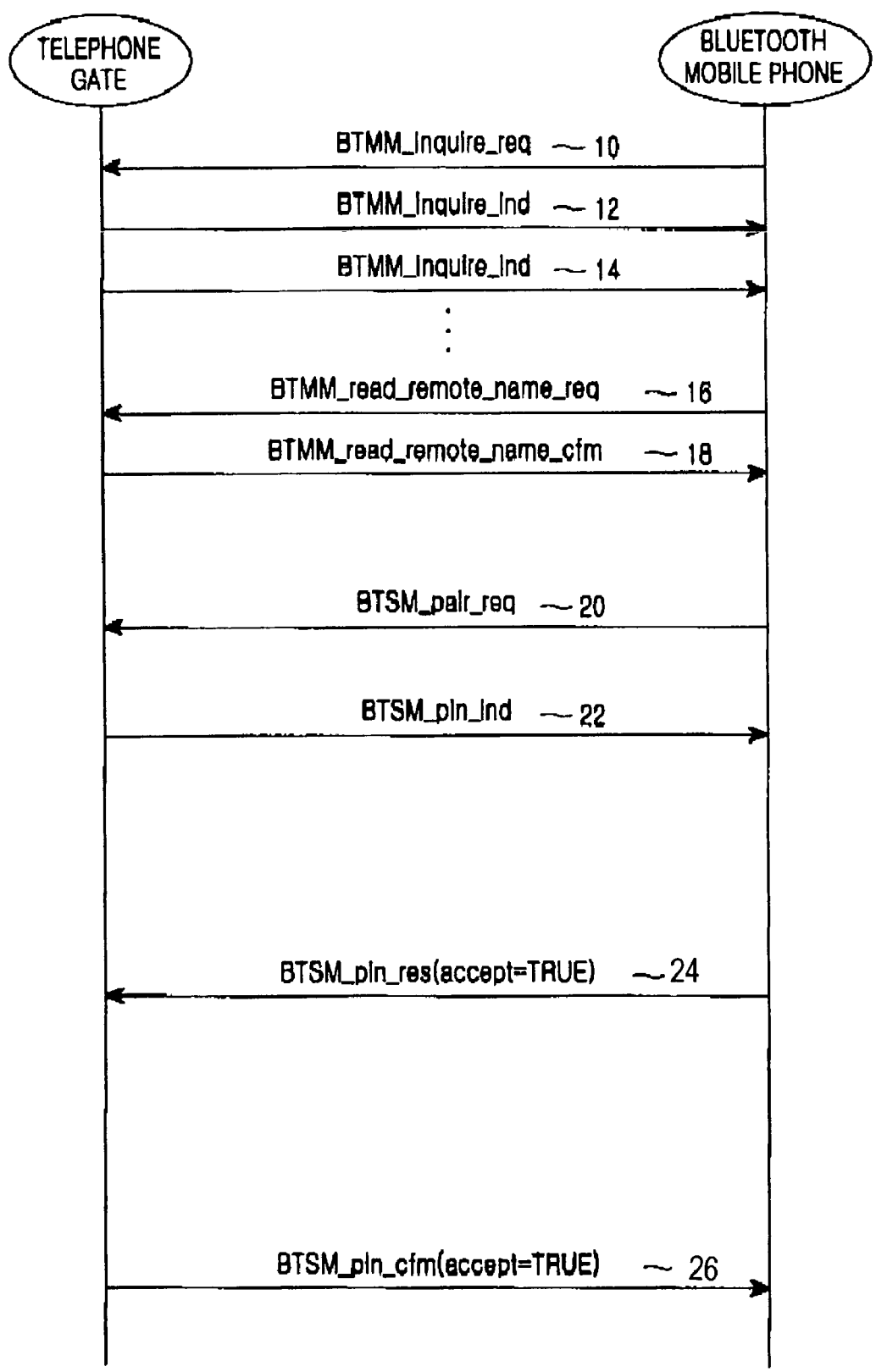
FIG. 4 is a diagram showing a message flow in a process of pairing between a telephone gate and a combined cordless/mobile phone having a Bluetooth module according to an embodiment of the present invention.

FIG. 4 is a diagram showing a message flow in a process of pairing between a telephone gate and a combined cordless/mobile phone having a Bluetooth module according to an embodiment of the present invention.

In order to connect a combined cordless/mobile phone through a Bluetooth communication with a battery charging apparatus connected with wire network so as to enable the mobile phone to be used as a cordless telephone, the mobile phone and the battery charging apparatus must be paired with each other in advance. In this case, the pairing signifies registration of a combined cordless/mobile phone in a battery charging apparatus, which can be connected with the battery charging apparatus through a Bluetooth communication. The most important object of the pairing is to prevent another phone from connecting with the battery charging apparatus and thereby connecting with the wire network. Hereinafter, the process of the pairing will be described.

First, in step 10, the mobile phone 600 transmits a registration request message BTMM_inquired_req in order to find out whether there exists a telephone gate around it or not. In response to the registration request message, in steps 12 and 14, a predetermined number of telephone gates or battery charging apparatuses transmit a response message BTMM_inquire_ind to the mobile phone. Then, in step 16, the mobile phone 600 transmits a message BTMM_read_remote_name_req to found telephone gates, which requests the found telephone gates to transmit their Bluetooth addresses. In step 18, the telephone gates transmit their Bluetooth addresses, so that the mobile phone 600 can obtain a list of the telephone gates found in its vicinity. Thereafter, in step 20, the mobile phone 600 transmits a Bluetooth message BTSM_pair_req to one telephone gate which a user wants to register, thereby selecting the telephone gate. In step 22, after receiving the message BTSM_pair_req, the selected telephone gate transmits a Bluetooth message BTSM_pin_ind to the mobile phone, thereby requesting a user authority certification which will be described hereinafter. The user authority certification can be classified into two cases in which the mobile is either with or without a key input section. In the case where the mobile phone has a key input section, the telephone gate requests a password for the selected telephone gate to the mobile phone. In the case where the mobile phone has no key input section, the telephone gate may request an action of turning off and then turning on the power of the mobile phone again or may check whether a Bluetooth mobile phone having dimensions meeting the standard of a desktop battery charging apparatus has been assembled with the desktop battery charging apparatus or not. Then, the mobile phone requests the user to input the password. When the user has inputted a Bluetooth pin BT_PIN number of the telephone gate, the mobile phone transmits a message BTSM_pin_res (accept=TURE) containing the Bluetooth pin number to the telephone gate in step 24. The telephone gate determines whether the received Bluetooth pin number is correct or not. Thereafter, when the received Bluetooth pin number is correct, the telephone gate transmits a Bluetooth message BTSM_pin_cfm (accept=TURE) informing that the registration has been completed to the Bluetooth mobile phone, and stores the Bluetooth address BD_ADDR of the mobile phone in a pairing list. After that time, the telephone gate allows office line communications only with Bluetooth mobile phones included in the pairing list, and the maximum number of mobile phones which may be included in the pairing list may be three.

Figure 5:
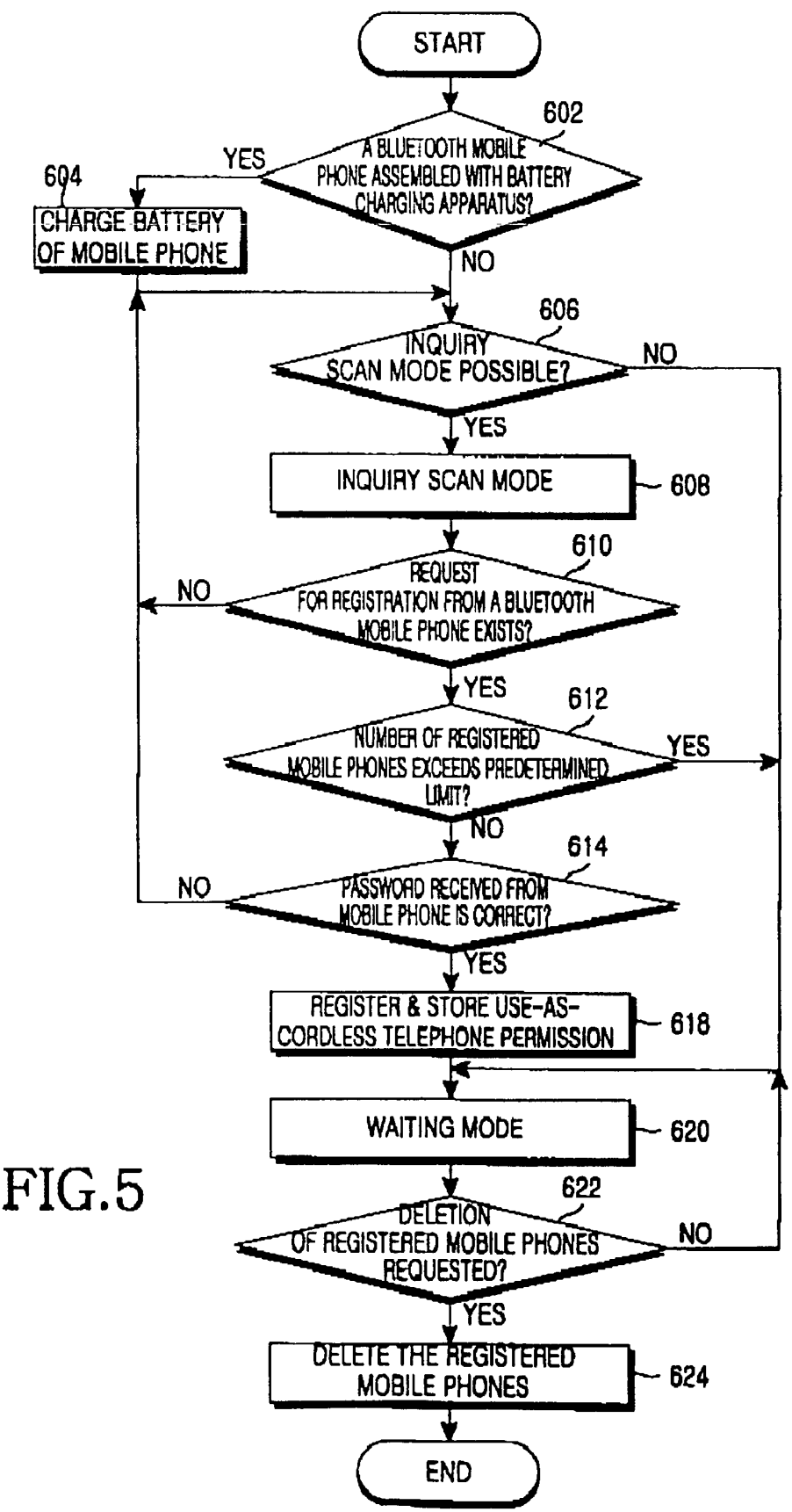
FIG. 5 is a flowchart of a process of registering a Bluetooth mobile phone in a battery charging apparatus according to the present invention.

FIG. 5 is a flowchart of a process of registering a Bluetooth mobile phone in a battery charging apparatus according to the present invention.

First, the battery charging apparatus determines whether a Bluetooth mobile phone is assembled with the battery charging apparatus or not in step 602. When the Bluetooth mobile phone is assembled with the battery charging apparatus, the battery charging apparatus charges a battery of the mobile phone in step 604. When the Bluetooth mobile phone is not assembled with the battery charging apparatus, the process goes to step 606. In step 606, the battery charging apparatus judges whether it can enter an Inquiry scan mode or not. In this case, the Inquiry scan mode is defined by Bluetooth specification 1.0 and signifies a state where the battery charging apparatus can receive an inquiry from another Bluetooth apparatus and inform a Bluetooth address of the Bluetooth apparatus. This state in which the battery charging apparatus can enter the Inquiry scan mode signifies the following states: first, a state in which a mobile phone having dimensions meeting the standard of the battery charging apparatus has been assembled with the battery charging apparatus; second, a state in which a predetermined period of time has not passed yet after a Bluetooth function key is pressed; and third, a state in which a predetermined period of time has not passed yet after a Bluetooth function key is pressed and a password for the battery charging apparatus is inputted (in the case where battery charging apparatus has a key input section), and a state in which a predetermined period of time has not passed yet after an electric power for the battery charging apparatus is turned on. As a result of the judgment, when the battery charging apparatus judges can enter the Inquiry scan mode, the battery charging apparatus enters the Inquiry scan mode in step 608. Thereafter, the battery charging apparatus judges whether there exists a request for registration from a Bluetooth mobile phone or not in step 610. When there exists a request for registration from a Bluetooth mobile phone, the battery charging apparatus determines whether the number of registered mobile phones exceeds a predetermined limit or not in step 612, and then determines whether the password received from the mobile phone is correct or not in step 614. When the password received from the mobile phone is correct, the battery charging apparatus registers and stores a use-as-cordless telephone permission so as to enable the mobile phone to be used as a cordless telephone in step 618. Thereafter, in step 620, the battery charging apparatus is in a waiting mode, so that a user can make a phone call by utilizing the mobile phone as a cordless telephone. When the user requests deletion of the registered mobile phones in step 622, the battery charging apparatus deletes the registered mobile phones in step 624.

Figure 6:
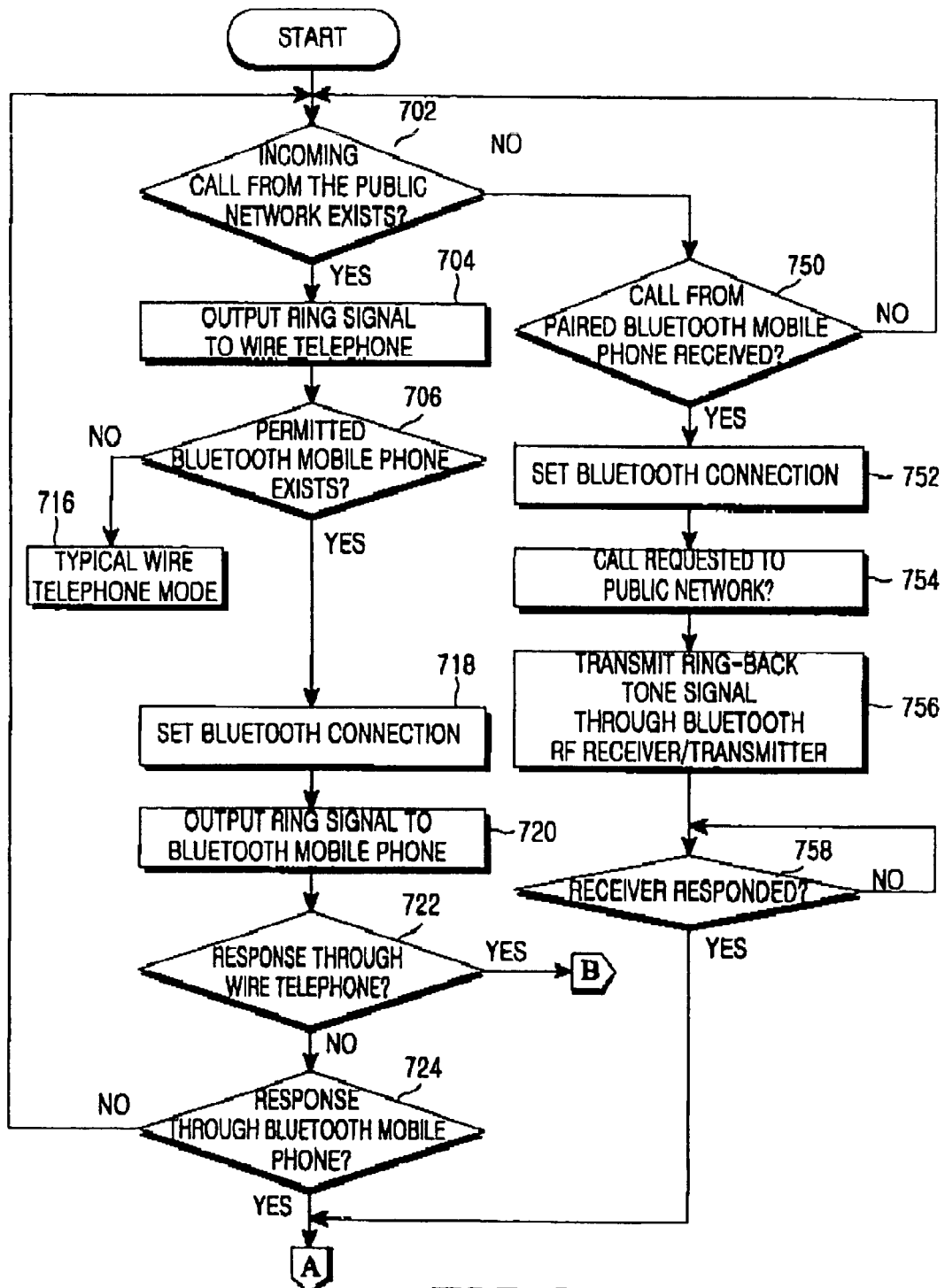
FIG. 6 is a flowchart of a call processing procedure in a battery charging apparatus according to the present invention.

FIG. 6 is a flowchart of a call processing procedure in a battery charging apparatus according to the present invention. According to the present invention, the battery charging apparatus connects a call from the public network to a combined cordless/mobile phone a call from a combined cordless/mobile phone to the public network through the Bluetooth communication.

First, in step 702, the battery charging apparatus determines whether there exists an incoming call from the public network or not. When there exists an incoming call from the public network, the battery charging apparatus outputs a ring signal to a wire telephone in step 704. Then, in step 706, the battery charging apparatus judges whether there exists a Bluetooth mobile phone having a permission to be used as a cordless telephone or not. In this case, this judgment is carried out by determining whether or not there exists a Bluetooth mobile phone which has obtained the use-as-cordless telephone permission through the registering process.

When a Bluetooth mobile phone having the permission is in a cordless telephone mode, the battery charging apparatus sets a Bluetooth connection in step 718 and outputs a ring signal to the Bluetooth mobile phone in step 720. The battery charging apparatus judges whether the user responds to the incoming call through the wire telephone or not in step 722, and judges whether the user responds to the incoming call through the Bluetooth mobile phone or not in step 724. When the user responds to the incoming call through the wire telephone, a process A is initiated. In contrast, when the user responds to the incoming call through the Bluetooth mobile phone, a process B is initiated.

Figure 7:
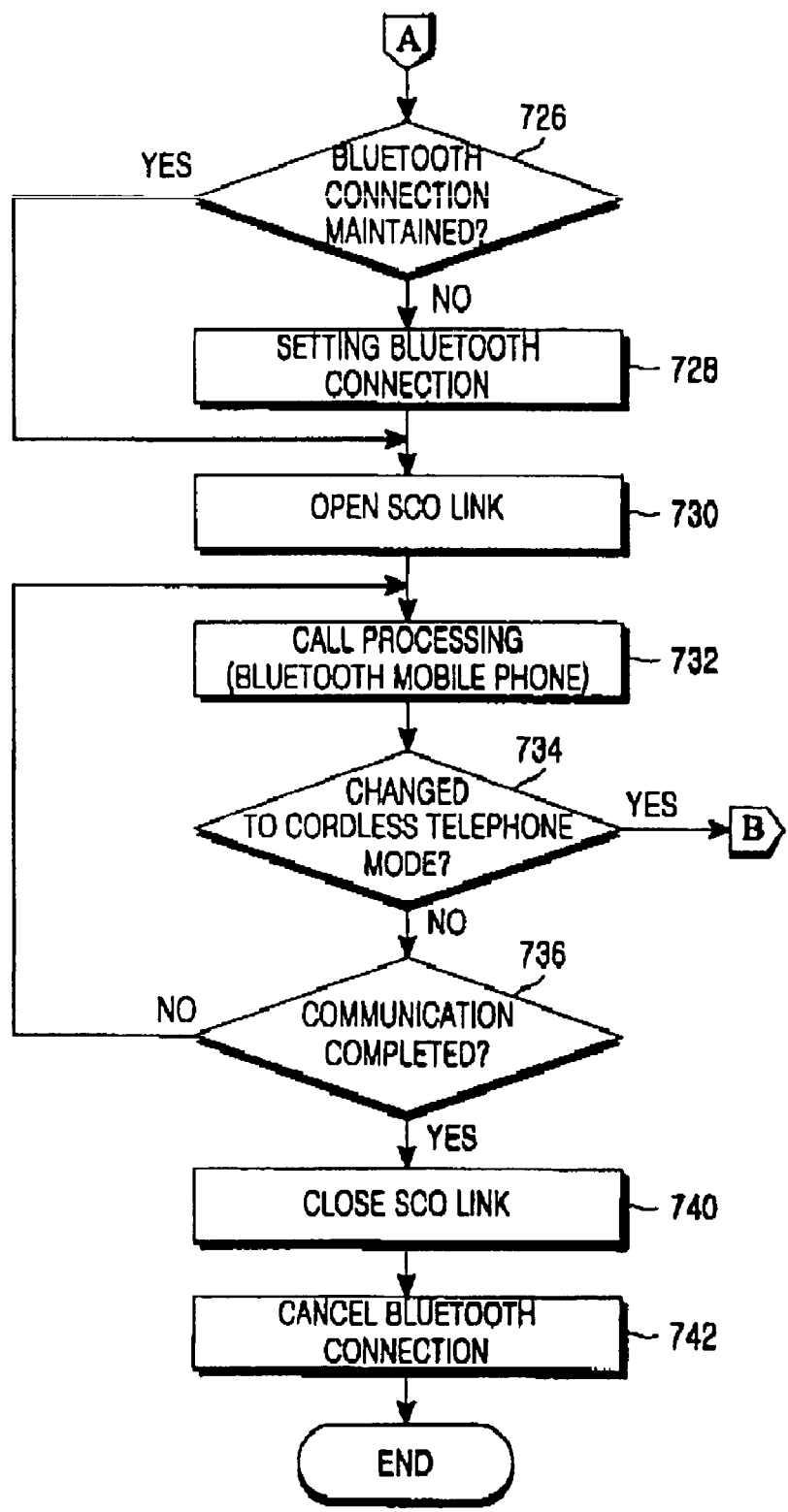
FIG. 7 is a flowchart of a call processing procedure in the case where the user responds to the incoming call through the Bluetooth mobile phone.

FIG. 7 is a flowchart of a call processing procedure in the case where the user responds to the incoming call through the Bluetooth mobile phone.

When the user responds to the incoming call through the Bluetooth mobile phone, the battery charging apparatus judges whether the Bluetooth connection is maintained or not in step 726. When the Bluetooth connection is not being maintained, the battery charging apparatus sets the Bluetooth connection again in step 728. When the Bluetooth connection is being maintained, the process goes to step 730. In step 730, the battery charging apparatus opens an SCO link between the battery charging apparatus and the Bluetooth mobile phone, so that the user can use the Bluetooth mobile phone in performing a communication through the public network. In other words, the battery charging apparatus opens the SCO link in step 730, thereby enabling the user to use the Bluetooth mobile phone as a cordless telephone in step 732. Thereafter, in step 734, the battery charging apparatus judges whether the user has changed the communication mode of the Bluetooth mobile phone to a cordless telephone mode or not. As a result of the judgment, when it is confirmed that the user has changed the communication mode of the Bluetooth mobile phone to the cordless telephone mode, the process B is initiated. In step 736, the battery charging apparatus judges whether the user has terminated communication or not. When the user has terminated the communication, the battery charging apparatus enters step 740. In contrast, when the user is performing the communication, the battery charging apparatus returns to step 732. When the communication has been terminated, the battery charging apparatus closes the SCO link in step 740, and then cancels the Bluetooth connection in step 742.

Figure 8:
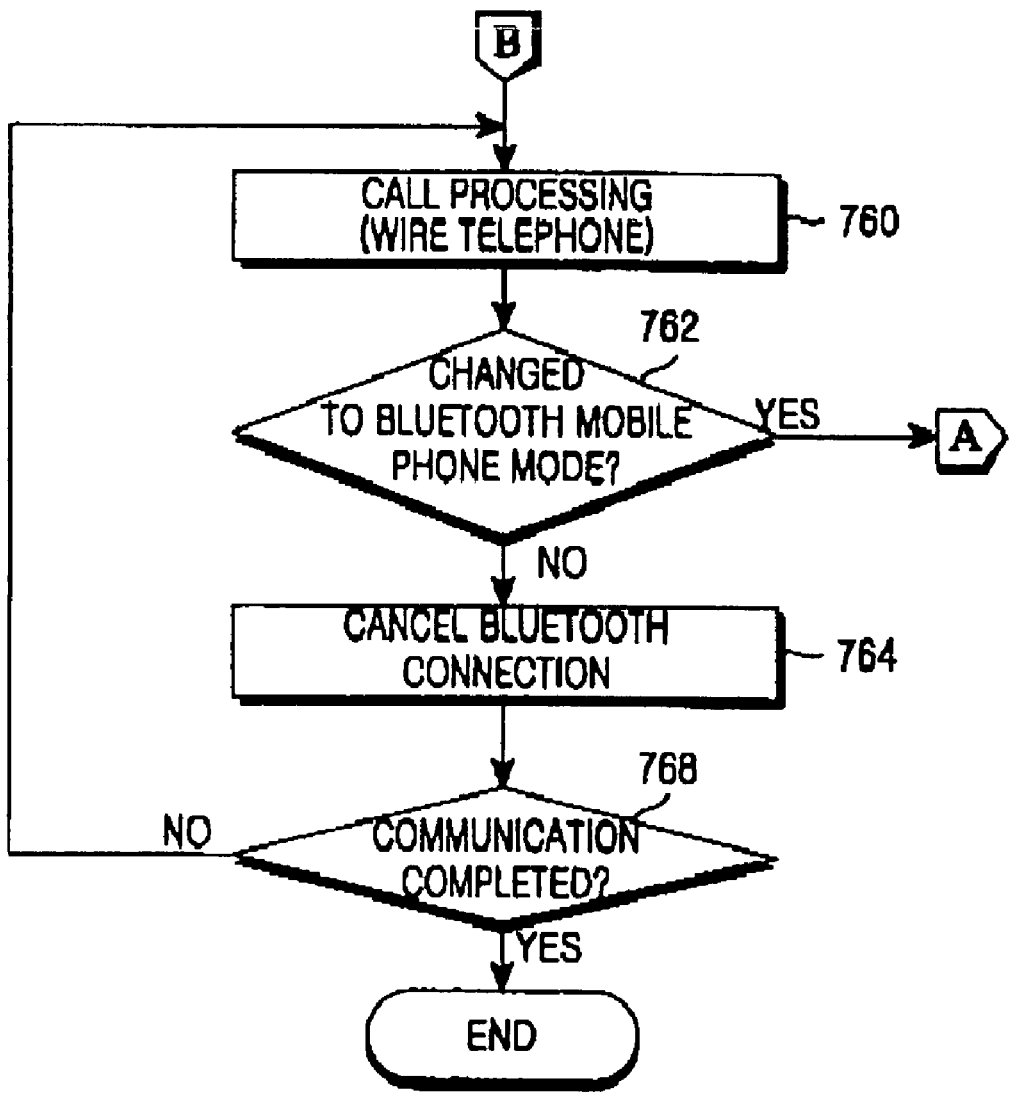
FIG. 8 is a flowchart of a call processing procedure in the case where the user responds to the incoming call through the wire telephone.

FIG. 8 is a flowchart of a call processing procedure in the case where the user responds to the incoming call through the wire telephone.

When the user responds to the incoming call through the wire telephone, the battery charging apparatus allows the user to continue a communication through the wire telephone in step 760. Thereafter, in step 762, the battery charging apparatus judges whether the user has changed a communication mode from a wire telephone mode to a Bluetooth mobile phone mode or not. When the user has changed the communication mode to the Bluetooth mobile phone mode, the battery charging apparatus enters the process A. In contrast, when the user continues the communication through the wire telephone, the battery charging apparatus cancels the Bluetooth connection in step 764. Thereafter, the battery charging apparatus determines whether the communication has been completed in step 768. The process returns to step 760 when the communication is being continued.

Figure 9:
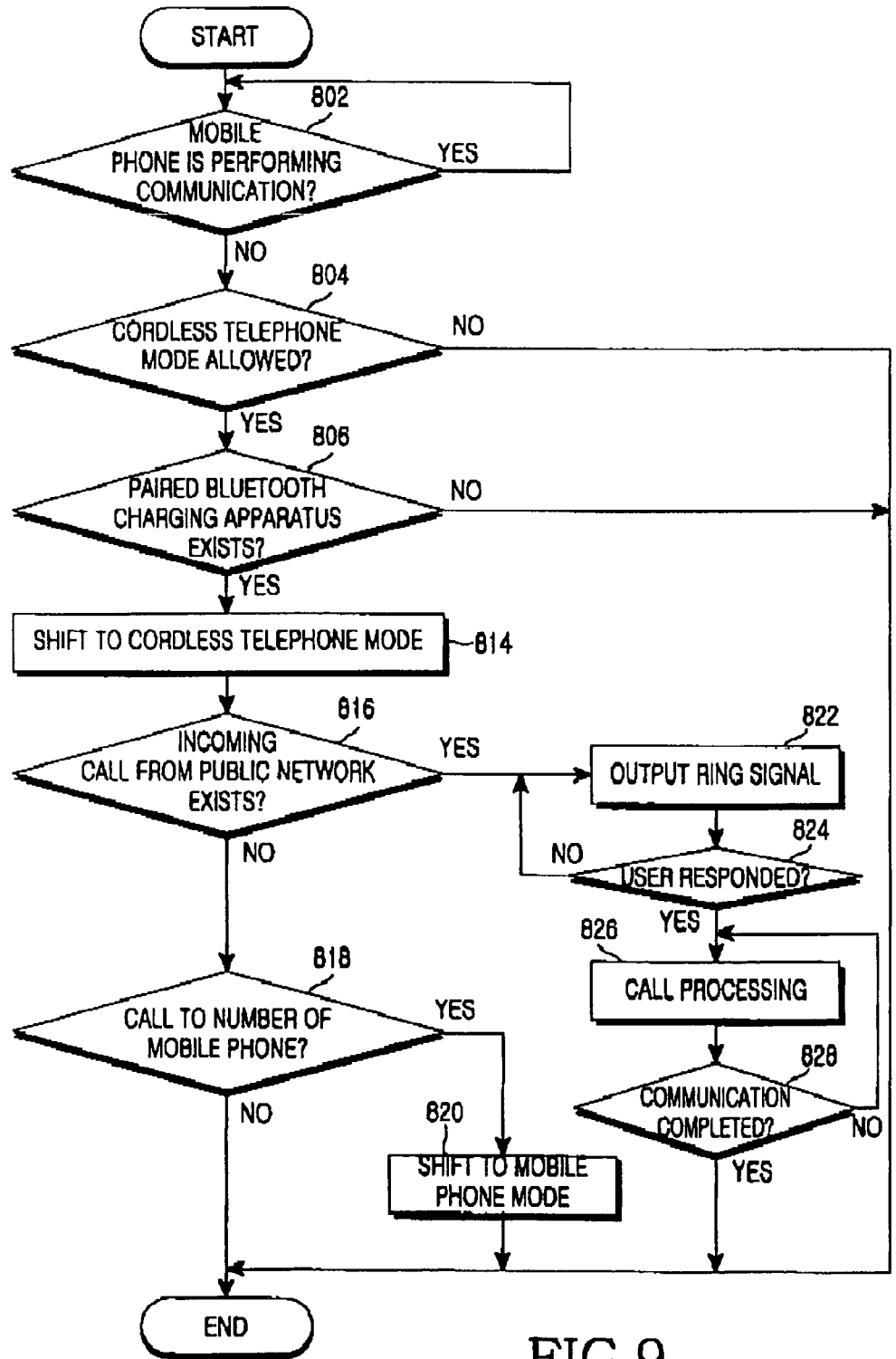
FIG. 9 is a flowchart of an operation of a Bluetooth mobile phone in a cordless telephone mode according to the present invention.

FIG. 9 is a flowchart of an operation of a Bluetooth mobile phone in a cordless telephone mode according to the present invention.

Firtst, the mobile phone 600 determines whether the mobile phone is performing a communication or not in step 802, and enters step 804 when the mobile phone is not used. In step 804, the mobile phone 600 determines whether a cordless telephone mode is allowed or not. Then, in step 806, the mobile phone 600 determines whether there exists any paired Bluetooth battery charging apparatus or not, and sets the mode of the Bluetooth mobile phone to the cordless telephone mode in step 814. After the cordless telephone mode is set, the mobile phone 600 determines whether there exists an incoming call from the public network in step 816. When there exists an incoming call from the public network, the mobile phone 600 outputs a ring signal in step 822. The mobile phone 600 determines whether the user responds to the incoming call in step 824, and processes the call in a general way in step 826. Thereafter, the mobile phone 600 determines whether the communication is completed or not in step 828, and the process is ended when the communication is completed.

In the case where there exists no incoming call from the public network according to the determination of the mobile phone 600 in step 816, the mobile phone 600 enters step 818 and judges whether there exists an incoming call to the number of the mobile phone or not. When there exists an incoming call to the number of the mobile phone, the mobile phone 600 shifts its mode to a mobile phone mode so that it can be used as a typical mobile phone.

Figure 10:
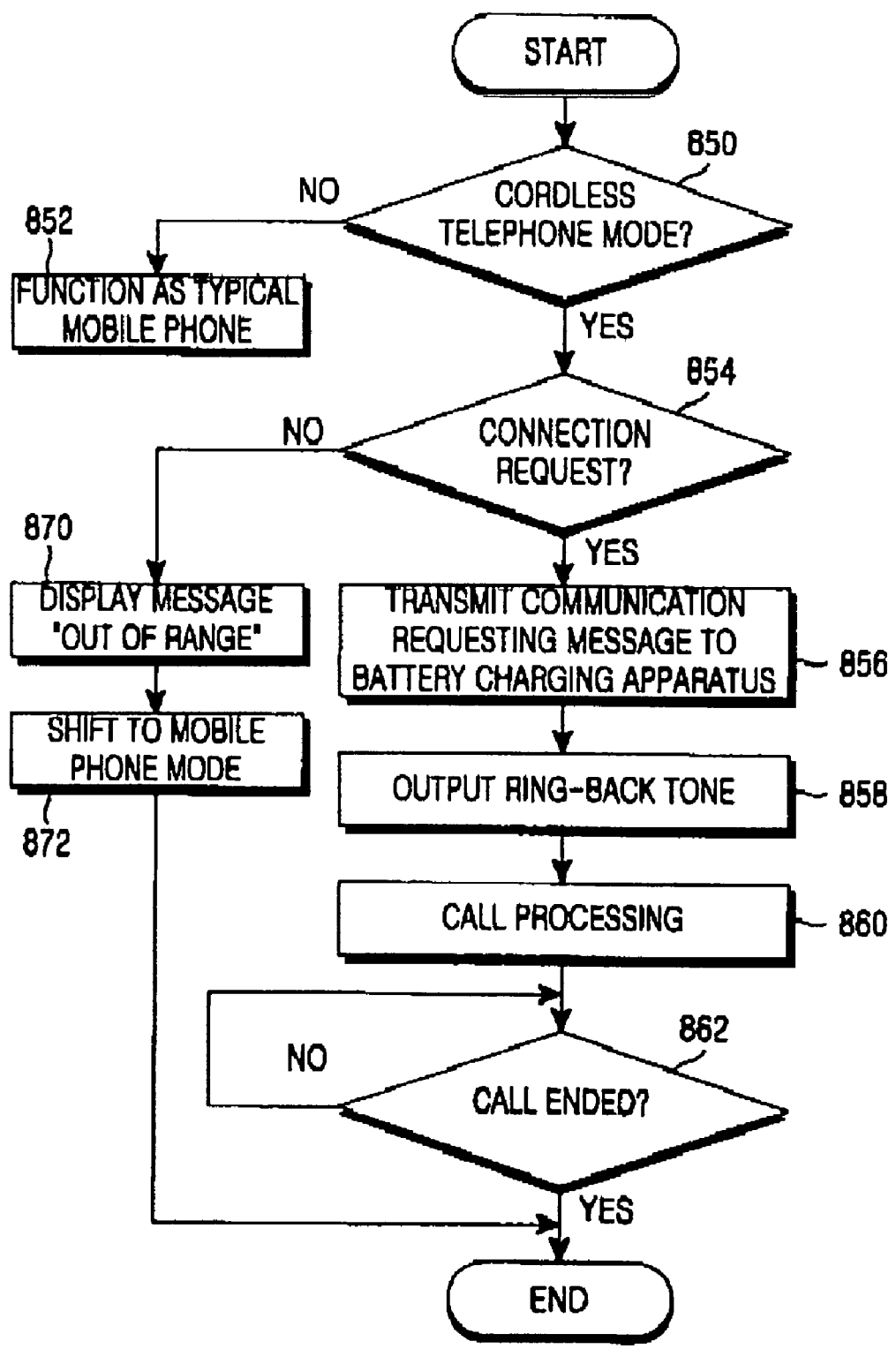
FIG. 10 is a flowchart of an operation of a Bluetooth mobile phone according to the present invention in the case where the Bluetooth mobile phone originates a call through a public network.

FIG. 10 is a flowchart of an operation of a Bluetooth mobile phone according to the present invention in the case where the Bluetooth mobile phone originates a call through a public network.

First, the mobile phone 600 determines whether it is in the cordless telephone mode or not in step 850. When the user wants to originate a call through a public network, the user can set the mode of the mobile phone 600 into the cordless telephone mode. When the mobile phone 600 is not in the cordless telephone mode, the mobile phone 600 can function as a typical mobile phone in step 852. In step 854, the mobile phone 600 requests the Bluetooth connection and judges whether the Bluetooth connection has been made or not. When the mobile phone 600 has been connected with the Bluetooth battery charging apparatus through the Bluetooth communication, the mobile phone 600 outputs a ring-back tone in step 858 and then processes the call in step 860. Thereafter, the mobile phone 600 determines whether the communication has been completed or not in step 862, and ends the process when the communication has been completed.

When it is confirmed from the judgment in step 854 that the mobile phone 600 has failed to connect with the Bluetooth battery charging apparatus, the mobile phone 600 displays a message, for example "out of range", in step 870. From this message, the user can move to an area in which the user can originate a call through a public network. Thereafter, in step 872, the mobile phone 600 converts its mode to a mobile phone mode, so that it can be used as a typical mobile phone.

As described above, the present invention provides an apparatus which has a construction modified from a conventional desktop battery charging apparatus having been utilized only in charging a battery of a mobile phone in the prior art, so that the apparatus can be connected with a general wire telephone network and a mobile phone having a Bluetooth module, thereby enabling a mobile phone to be used not only for its own use but also as a cordless telephone.

According to the present invention described above, a mobile phone can be connected with a typical wire public network to perform a communication, thereby enabling a user of the mobile phone to feel convenient and save the call charge.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A battery charging apparatus for charging a battery of a combined cordless/mobile phone, the battery charging apparatus comprising a telephone section and a Bluetooth section, wherein:
    the telephone section is connected between a public network and the Bluetooth section so as to interface an incoming call from the public network to the combined cordless/mobile phone through the Bluetooth section and to interface a call oriented from the combined cordless/mobile phone to the public network through the Bluetooth section;
    the Bluetooth section is connected between the telephone section and the combined cordless/mobile phone so as to transmit and receive wireless data; and further wherein the telephone section includes
    a ring signal detection circuit which is connected with a public network and which detects a ring signal of a received call;
    an office line connection circuit which interfaces a call command and an audio signal of a telephone; and
    a CODEC which is connected between the Bluetooth section and the office line connection circuit so as to convert PCM data into analog voice and vice versa.

2. A battery charging apparatus as claimed in claim 1, wherein the telephone section further comprises a key input section.

3. A battery charging apparatus as claimed in claim 1, wherein the telephone section further comprises a speaker and a microphone.

4. A battery charging apparatus for charging a battery of a combined cordless/mobile phone, the battery charging apparatus comprising a telephone section and a Bluetooth section, wherein:
    the telephone section is connected between a public network and the Bluetooth section so as to interface an incoming call from the public network to the combined cordless/mobile phone through the Bluetooth section and to interface a call oriented from the combined cordless/mobile phone to the public network through the Bluetooth section; and
    the Bluetooth section is connected between the telephone section and the combined cordless/mobile phone so as to transmit and receive wireless data; and further wherein the Bluetooth section includes
    a first control section controlling an operation of the Bluetooth section;
    a memory storing a program for controlling the first control section;
    a PCM interface circuit connected with the telephone section so as to transmit and receive PCM data;
    an RF receiver/transmitter connected with the first control section so as to transmit and receive data through a Bluetooth antenna; and
    an antenna connected with the RF receiver/transmitter so as to transmit and receive data through RF wave.

5. A battery charging apparatus as claimed in claim 4, wherein the first control section of the Bluetooth section controls a battery-charging operation of the battery charging apparatus and an operation of the telephone section.

6. A battery charging apparatus as claimed in claim 4, wherein the telephone section comprises:
    a second control section controlling an operation of the telephone section;
    a memory storing a program for controlling the second control section;
    a ring signal detection circuit which is connected with a public network and which detects a ring signal of a received call;
    an office line connection circuit which interfaces a call command and an audio signal of a telephone; and
    a CODEC which is connected between the Bluetooth section and the office line connection circuit so as to convert PCM data into analog voice and vice versa.

7. A battery charging apparatus as claimed in claim 6, wherein the CODEC of the telephone section and the PCM interface circuit of the Bluetooth section interface voice in a PCM mode.

8. A battery charging apparatus as claimed in claim 6, wherein the first control section of the Bluetooth section and the second control section of the telephone section interface an HCI data packet.

9. A method of enabling a mobile phone to be used as a cordless telephone by utilizing a battery charging apparatus, the battery charging apparatus including a Bluetooth section, the battery charging apparatus being connected with a public network through a cable and with a combined cordless/mobile phone by wireless through a Bluetooth communication so as to process calls, the method comprising the steps of:
    detecting an incoming call from the public network;
    interfacing a call command and an audio signal of a telephone through an office line connection circuit;
    setting a Bluetooth connection between the combined cordless/mobile phone and the battery charging apparatus;
    outputting a ring signal to the combined cordless/mobile phone;
    converting PCM data into analog voice and vice versa using a CODEC connected between the Bluetooth section and the office line connection circuit; and
    transmitting and receiving voice data through the Bluetooth connection to thereby enable communication through the combined cordless/mobile phone, when there is a response from the combined cordless/mobile phone.

10. A method of enabling a mobile phone to be used as a cordless telephone by utilizing a battery charging apparatus, the battery charging apparatus including a Bluetooth section, the battery charging apparatus being connected with a public network through a cable and with a combined cordless/mobile phone by wireless through a Bluetooth communication so as to process calls, the method comprising the steps of:
    detecting a call from the combined cordless/mobile phone to the public network;

setting a Bluetooth connection when there is a call from the combined cordless/mobile phone to the public network;

requesting the call to the public network;

interfacing a call command and an audio signal of a telephone with an office line connection circuit;

outputting a ring-back tone signal through the combined cordless/mobile phone;

converting PCM data into audio voice and vice versa using a CODEC connected between the Bluetooth section and the office line connection circuit; and transmitting and receiving voice data through the Bluetooth connection to thereby enable communication through the combined cordless/mobile phone, when there is a response from the public network.

11. A method of enabling a mobile phone to be used as a cordless telephone by utilizing a combined cordless/mobile phone, the combined cordless/mobile phone being connected with a Bluetooth apparatus by wireless through a Bluetooth communication so as to process calls, the Bluetooth apparatus including a Bluetooth section and being connected with a public network through a cable, the method comprising the steps of:

receiving an incoming call from the Bluetooth apparatus to the public network;

outputting a ring signal for the incoming call;

controlling operation of the Bluetooth section with a first control section;

storing a program in memory for controlling the first control section; and transmitting and receiving voice data through a Bluetooth connection to and from the public network, thereby enabling communication through the combined cordless/mobile phone, when there is a response from a user, wherein the transmitting and receiving includes transmitting and receiving PCM data through a PCM interface circuit connected with a telephone section; transmitting and receiving data through a Bluetooth antenna through an RF receiver/transmitter connected with the first control section; and transmitting and receiving data through RF waves using an antenna connected with the RF receiver/transmitter.

12. A method of enabling a mobile phone to be used as a cordless telephone by utilizing a combined cordless/mobile phone, the combined cordless/mobile phone being connected with a Bluetooth apparatus by wireless through a Bluetooth communication so as to process calls, the Bluetooth apparatus including a Bluetooth section and being connected with a public network through a cable, the method comprising the steps of:

transmitting a communication request message to the Bluetooth apparatus when a user makes a phone call;

outputting a ring-back tone signal from the Bluetooth apparatus;

controlling operation of the Bluetooth section with a first control section;

storing a program in memory for controlling the first control section; and transmitting and receiving voice data through the Bluetooth connection to thereby enable communication through the combined cordless/mobile phone, when there is a response from the public network, wherein the transmitting and receiving includes transmitting and receiving PCM data through a PCM interface circuit connected with a telephone section; transmitting and receiving data through a Bluetooth antenna through an RF receiver/transmitter connected with the first control section; and transmitting and receiving data through RF waves using an antenna connected with the RF receiver/transmitter.

* * * * *